Patented Sept. 15, 1936

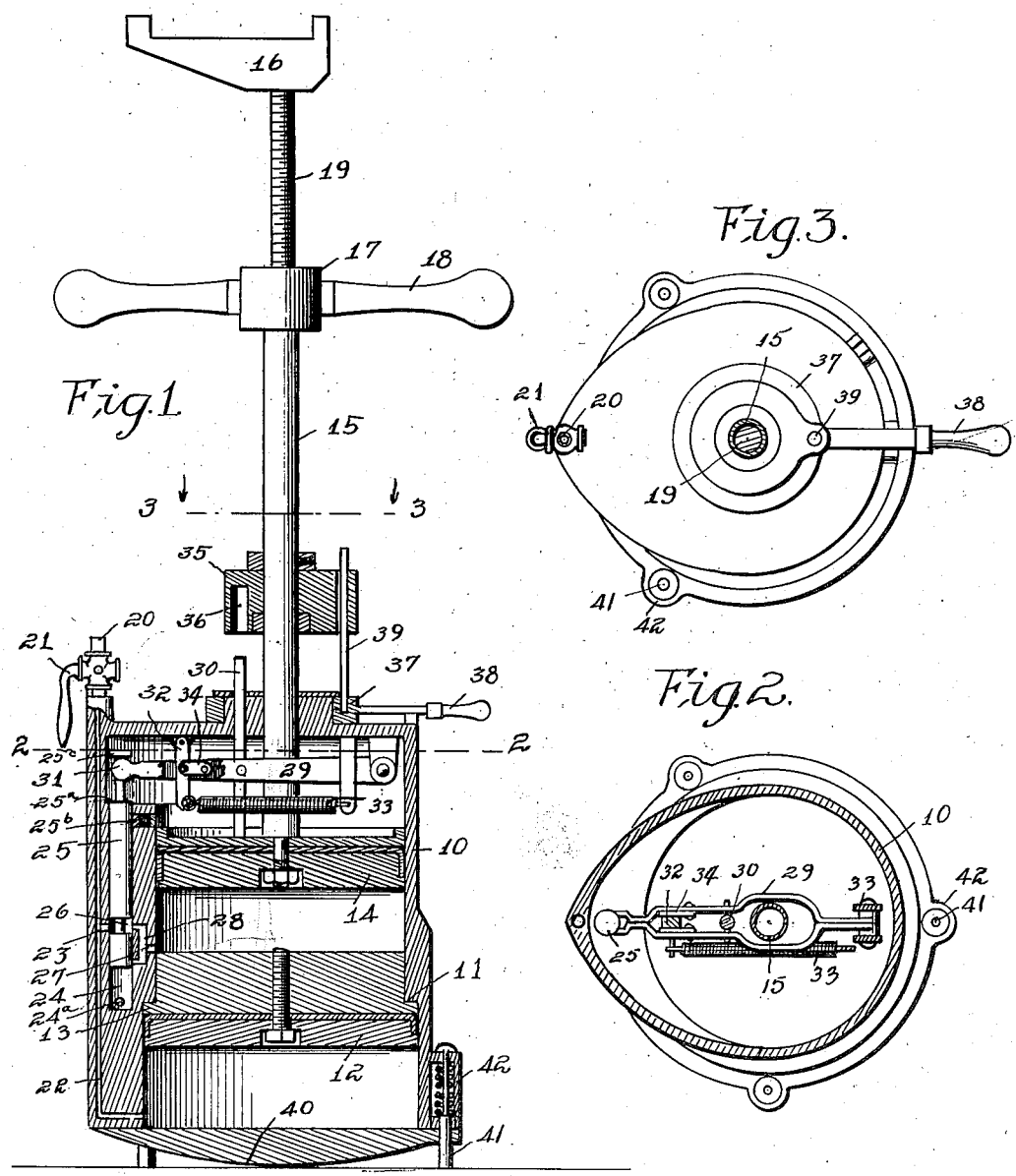

2,054,550

UNITED STATES PATENT OFFICE 2,054,550

VIBRATING AUTOMOBILE JACK

Elmer B. Thompson, Des Moines, Iowa, assignor to Globe Machinery & Supply Company, Des Moines, Iowa, a corporation of Iowa Application December 15, 1933, Serial No. 702,508

9 Claims. (Cl. 73—51)

In servicing automobiles, and particularly in greasing the springs and spring shackles, it has been demonstrated that the grease will penetrate between the spring leaves and around the shackle bolts more readily and uniformly if the automobile frame is vibrated during such greasing.

My improved jack is specially designed to be used in connection with an automobile lift for elevating the automobile before my improved jack is applied, and so that when the jack is applied, the automobile springs and shackles will be conveniently accessible to the operator.

One of the objects of my invention is to provide a jack of this character which may be easily and conveniently placed in position relative to an automobile supported in an elevated position upon an automobile lift.

A further object is to provide a jack of this character which will operate with a minimum of applied power for air compressing purposes.

Another object is to provide a lift of this character in which air under pressure may be economically used first in elevating the jack, and the automobile frame to which it is applied, a short distance, as required to relieve the tension on the springs and shackles, and then hold the automobile frame in said elevated position, thereby obviating the necessity of using manual power for that purpose, and further it is my object to provide automatically actuated means for utilizing air under pressure for vibrating the automobile frame up and down through a short path of travel, while the greasing operation is in progress to thereby aid in causing the grease to more readily and thoroughly penetrate the spaces between the spring leaves and around the shackle bolts.

A further object is to provide a jack of this character which will normally stand in a substantially upright position, but which will rest firmly upon a supporting surface which is inclined from the horizontal.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a vertical central sectional view of my improved jack.

Figure 2 shows a transverse sectional view on the line 2—2 of Figure 1.

Figure 3 shows a transverse sectional view on the line 3—3 of Figure 1.

Referring to the accompanying drawing, I have used the reference numeral 10 to indicate generally the cylinder. The lower portion of the cylinder is of greater diameter than the upper portion and has an inwardly extending shoulder 11 at the upper end of the lower portion of the cylinder. Mounted within the lower portion of the cylinder is a piston 12 having an outwardly extended shoulder at 13 to limit the upward movement of the piston by engagement with the shoulder 11 of the cylinder.

Mounted within the upper portion of the cylinder is a piston 14. Fixed to this upper piston is an upright jack member 15 having an automobile frame engaging device 16 at its upper end, and having a rotatable nut 17 with handles 18 applied to the screw threaded portion 19 to provide means for manually adjusting this jack in the manner of an ordinary screw jack.

For operating the pistons I have provided a pipe 20 leading to a source of compressed air or other fluid under pressure, and this pipe is controlled by a three way valve 21 of ordinary construction, having a port 22 leading from it to the space below the lower piston.

A second passageway 23 leads from the passageway 22 to a valve chamber 24 having an exhaust port 24a, and in this valve chamber there is mounted a slide valve 25, and this slide valve has an air passageway 26 extending around it at one point. Communicating with this passageway 26 is a passageway 27 leading to the interior of the cylinder, and another passageway 28 leads from the cylinder to the bottom of the valve chamber 24.

These parts are so arranged and proportioned that when both pistons are at their lower limit of movement and the valve 21 is opened, then air under pressure moves through the passageway 22 to a point below the lower piston, and the lower piston together with the upper piston is then raised by the air pressure until the shoulders 13 of the lower piston engage the shoulder 11 of the cylinder, and when in this position the upper piston is substantially at the level of the passageway 27, and if the valve 25 is in proper position, as hereinafter explained, then air under pressure will enter between the upper and lower pistons and will raise the upper piston to its upper limit, and the lower piston will still remain in its elevated position.

After the upper piston has been elevated as before described, it is desirable that this upper piston be vibrated up and down, and for this purpose, I have provided the following mechanism:

Fulcrumed on the interior of the cylinder is a lever 29 and mounted upon the top of the upper piston is a rod 30, which rod is fulcrumed to the lever 29. This lever 29 is also operatively connected at 31 to the slide valve 25, so that when the upper piston moves upwardly, the slide valve is raised, to thereby elevate it above the port 27 so that air contained within the space between the two pistons may escape, and when the upper piston moves downwardly, the slide valve 25 is also moved downwardly, and when it reaches a certain position of its downward movement, the ports will be opened to permit the entrance of air under pressure to the space between the pistons to again raise the upper piston.

As clearly shown in Figure 1 of the drawing the lower piston and the lower part of the cylinder in which it is mounted are of greater diameter than the upper piston and the corresponding part of the cylinder, hence, when the pressure below both pistons is substantially equal and the lower piston is in an elevated position, the upper piston will raise and the lower piston remain in said elevated position.

For the purpose of causing a rapid movement of the slide valve at certain times in its travel, I have provided a lever 32 having a spring 33 attached to it, and this lever has a link 34 pivoted to it and to the lever 29.

By this arrangement it is obvious that when the lever 29 has been moved upwardly by the rod 30 through a part of its movement, then the link 34 will move past a dead center and the spring 33 will then cause the link 34 to move the lever 29 rapidly upwardly to thereby form a wide open exhaust port at the bottom of the slide valve, and this same action is repeated in a reverse manner during the downward movement of the upper piston, whereby when the upper piston is moving upwardly and downwardly at considerable speed, the inlet and outlet ports will remain open for a proper period of time during such operation.

Rotatively mounted upon the jack member 15 is a stop member 35 having an opening 36 therein extending upwardly for a certain distance within the stop member 35. Means are provided for rotating this stop member 35, comprising a rotatable collar 37 provided with a handle 38 and an upright rod 39 extending loosely through an opening in the stop member 35. When this stop member 35 is in the position shown in Figure 1, then the rod 30 may move up and down in its ordinary path of travel, causing its upper end to enter the opening 36, and no movement to be imparted to the rod 30 or the valve 25.

The operation of the upper piston 14 to accomplish a rapid up and down movement of the member 16 is as follows:

Assuming that the stop member 35 has been rotated to position whereby the upper end of the rod 30 will engage the under surface of said stop, and that the piston 14 is resting on the piston 12, after having moved the valve 21 to an open position, and that the valve 25 is at its lower limit of movement, as illustrated in Figure 1, with the member 31 resting on the shoulder 25a of said valve, said valve being frictionally held in either its elevated or lowered position by means of a spring actuated block 25b, then air under pressure will enter the ports 23, 26 and 27 and beneath the piston 14, causing said piston together with the stop 35 to be elevated.

Further upward movement of the piston 14 will cause its upper surface to engage the lower end of the rod 30, causing the free end of the member 29 to be elevated until the member 31 engages the head 25c of the valve 25. At the same time the link 37 is snapped past dead center, causing quick upward movement of the member 31, which in turn will cause the valve 25 to be elevated, closing the port 23 and opening the lower end of the passage 28. Air will then escape through the exhaust passage 24a, allowing the piston 14 to move downwardly until the under surface of the member 35 engages the upper end of the rod 30, at which time the valve 25 will again be moved to its lower position of movement, in the manner before described.

When it is desired to stop the rapid oscillation of the piston 14, the handle 38 is grasped and the member 35 rotated to position with the opening 36 directly over the rod 30. The valve 21 is then moved to exhaust position, allowing both of the pistons 14 and 12 to move to their lower limit of movement at which time the upper end of the rod 30 enters the opening 36 and engages the upper end of said opening and moves the valve 25 to its lower limit of movement, thus leaving it in its normal position.

I have demonstrated in practice that with my improvement a certain predetermined amount of compressed air will raise the piston 12 and hold it in its elevated position, then when it is thus held, compressed air is admitted to and discharged from the relatively small space between the two pistons, which requires only a comparatively small amount of compressed air and a correspondingly small amount of power for air compressing purposes. To illustrate: If the lower piston were omitted and the upper piston only were used, then each time that the air was exhausted it would be in a quantity nearly equal to the combined capacity of the entire cylinder, and when air was admitted it would have to be in such quantities as to bring the entire interior of the cylinder up to the desired pressure for elevating an automobile, hence, much power would be wasted. With my improvement the upper chamber of the cylinder in which the upper piston travels is relatively small and relatively small amounts of compressed air are admitted and exhausted from it when vibrating the automobile.

It frequently occurs that where these automobile jacks are used, the floor surface on which they rest is inclined to a considerable extent from the horizontal for drainage purposes and the like, and I have provided a structure for the base of the jack in which the base body is made convex at 40, so that the center of the base will rest firmly upon either a horizontal or an inclined surface, and for the purpose of maintaining the jack upright when placed on such inclined surface, I have provided a series of spring actuated lugs 41 at various points around the outer surface of the jack normally held downwardly by the spring 42, and these spring actuated lugs will maintain the jack in a substantially upright position so it will not tilt over, and when pressure is applied to the jack to raise an automobile frame or the like, then the spring lugs 41 will move and yield sufficiently to permit the center of the base to firmly contact with the inclined surface with the jack remaining in a substantially upright position.

In practice I have found that with my improvement an operator may very readily and easily place the jack in position in engagement with an automobile frame, but the operator does not need to exert enough power on the screw jack member to actually raise the frame, but merely to bring the frame engaging bracket of the jack into position for engaging the frame. Then when the compressed air is turned on, it will first elevate the automobile frame a short distance, which as is well known, will separate the spring leaves slightly, and also relieve strains from the shackles. This is accomplished by first raising the lower piston which is held in its elevated position and maintains the springs and shackles in said condition. Thereafter the upper piston may be vibrated through a path, the lower limit of which is defined by the elevated position of the lower piston. Then when the jack is thus vibrated, the spring leaves will move and the shackles will also move, so that grease will more readily and thoroughly penetrate.

One of the advantages of my improved device as attached to the lift frame is that with jacks which are supported upon the floor, it sometimes happens that through leakage or otherwise, the lift will slowly lower, and when such jacks are employed there is danger that the jack itself will tilt the automobile off of the lift during such lowering movement of the lift, or otherwise injure the automobile or lift. When, however, the cylinder is connected to and movable with the jack, all such danger is thereby obviated.

I claim as my invention:

1. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, and a valve mechanism automatically actuated by the up and down movement of the upper piston for alternately admitting and permitting the escape of fluid under pressure into the space between the pistons, for vibrating said upper piston.

2. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, and a valve mechanism automatically actuated by the up and down movement of the upper piston for alternately admitting and permitting the escape of fluid under pressure into the space between the pistons for vibrating said upper piston, said valve mechanism comprising a slide valve and ports arranged to permit the entrance of fluid under pressure below the upper piston when in one position and to permit the escape of fluid under pressure from below the upper piston when in another position, and a valve actuating mechanism operatively connected to the upper piston and to said slide valve arranged to move said slide valve to its intake position when the upper piston is at the lower portion of its movement and to move said slide valve to its exhaust position when the upper piston is at the upper portion of its movement.

3. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, and a valve mechanism automatically actuated by the up and down movement of the upper piston for alternately admitting and permitting the escape of fluid under pressure into the space between the pistons for vibrating said upper piston, said valve mechanism comprising a slide valve and ports arranged to permit the entrance of fluid under pressure below the upper piston when in one position and to permit the escape of fluid under pressure from below the upper piston when in another position, and a valve actuating mechanism comprising a lever fulcrumed at one end and connected to said slide valve, a rod connected to said upper piston and pivoted to said lever, a spring actuated lever fulcrumed to a stationary support, and a link pivotally connecting said levers, for the purposes stated.

4. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, and a valve mechanism automatically actuated by the up and down movement of the upper piston for alternately admitting and permitting the escape of fluid under pressure into the space between the pistons for vibrating said upper piston, said valve mechanism comprising a slide valve and ports arranged to permit the entrance of fluid under pressure below the upper piston when in one position and to permit the escape of fluid under pressure from below the upper piston when in another position, and a valve actuating mechanism operatively connected to the upper piston and to said slide valve arranged to move said slide valve to its intake position when the upper piston is at the lower portion of its movement and to move said slide valve to its exhaust position when the upper piston is at the upper portion of its movement, and a friction device for holding said slide valve in various positions of its movement.

5. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, and a valve mechanism automatically actuated by the up and down movement of the upper piston for alternately admitting and permitting the escape of fluid under pressure into the space between the pistons for vibrating said upper piston, said valve mechanism comprising a slide valve and ports arranged to permit the entrance of fluid under pressure below the upper piston when in one position and to permit the escape of fluid under pressure from below the upper piston when in another position, and a valve actuating mechanism operatively connected to the upper piston and to said slide valve arranged to move said slide valve to its intake position when the upper piston is at the lower portion of its movement and to move said slide valve to its exhaust position when the upper piston is at the upper portion of its movement, and an adjustable stop device for said rod carried by said upper piston, said stop device in one position engaging and limiting the upward movement of said rod and in another position permitting said upward movement.

6. In a jack, the combination of a base having a convex lower surface and a number of spring lugs near the periphery thereof for normally holding the jack in an upright position, said lugs being capable of yielding to permit the jack to remain in an upright position with the base firmly resting on an inclined surface.

7. In a jack of the class described, the combination of a cylinder, two independently movable pistons in the cylinder, a weight engaging means operatively connected with the upper one of said pistons, valve controlled means for admitting fluid under pressure below the lower piston for raising it, means for limiting the upward movement of the lower piston, a valve mechanism automatically actuated by the up and down movement of the upper piston for alternately admitting and permitting the escape of fluid under pressure into the space between the pistons, for vibrating said upper piston, and manually controlled means for rendering said automatic valve mechanism inoperative.

8. In a jack of the class described, the combination of a cylinder, two pistons within the cylinder, a weight engaging member operatively connected with the upper one of said pistons, means for admitting air under pressure below the lower piston to thereby elevate both pistons and hold them in position with the weight engaging member firmly in contact with a weight, means for limiting the upward movement of the lower piston, and means for alternately introducing fluid pressure and releasing it into and from the space between the pistons for vibrating the upper position through a path of travel wholly above the point to which the upper piston was moved to cause the weight engaging member to engage a weight.

9. In a jack of the class described, the combination of a cylinder, two independently movable pistons in the cylinder, a weight engaging means operatively connected with the upper one of said pistons, valve controlled means for admitting fluid under pressure below the lower piston for raising it, and a valve mechanism automatically actuated by the up and down movement of the upper piston for alternately admitting and permitting the escape of fluid under pressure into the space between the pistons for vibrating said upper piston, said lower piston being of greater area than the upper one, and the lower portion of the cylinder being of greater area than the upper portion thereof for limiting the movement of the lower piston.

ELMER B. THOMPSON.